United States Patent
Amurri

(10) Patent No.: US 9,403,309 B2
(45) Date of Patent: Aug. 2, 2016

(54) METHOD FOR CONTROLLING THE HEATING OF AN EXTRUSION DEVICE OF A SEMI-FINISHED PRODUCT MADE OF ELASTOMERIC MATERIAL

(75) Inventor: Cesare Emanuele Amurri, Milan (IT)
(73) Assignee: Pirelli Tyre S.p.A., Milan (IT)
( * ) Notice: Subject to any disclaimer, the term of this patent is extended or adjusted under 35 U.S.C. 154(b) by 643 days.
(21) Appl. No.: 13/807,177
(22) PCT Filed: Jun. 27, 2011
(86) PCT No.: PCT/IB2011/001515
§ 371 (c)(1), (2), (4) Date: Dec. 27, 2012
(87) PCT Pub. No.: WO2012/001492
PCT Pub. Date: Jan. 5, 2012
(65) Prior Publication Data
US 2013/0106011 A1 May 2, 2013
Related U.S. Application Data
(60) Provisional application No. 61/362,889, filed on Jul. 9, 2010.
(30) Foreign Application Priority Data
Jun. 28, 2010 (IT) .............................. MI2010A1171
(51) Int. Cl.
*B29C 47/92* (2006.01)
*B29C 47/00* (2006.01)
(Continued)
(52) U.S. Cl.
CPC ......... *B29C 47/0071* (2013.01); *B29C 47/0004* (2013.01); *B29C 47/364* (2013.01);
(Continued)
(58) Field of Classification Search
CPC ................. B29C 47/0872; B29C 2947/92485; B29C 2947/9298; B29C 47/367; B29C 2947/92704
See application file for complete search history.

(56) References Cited

U.S. PATENT DOCUMENTS 4,843,576 A * 6/1989 Smith ................ G05D 23/2011
165/238
6,104,006 A * 8/2000 Kimura .................. B29C 45/74
219/422
(Continued)

FOREIGN PATENT DOCUMENTS

CN 101039792 9/2007
CN 200945701 9/2007
(Continued)

OTHER PUBLICATIONS

International Search Report from the European Patent Office for International Application No. PCT/IB2011/001515, mailing date Oct. 18, 2011.
(Continued)

*Primary Examiner* — Jeffrey Wollschlager
(74) *Attorney, Agent, or Firm* — Finnegan, Henderson, Farabow, Garrett & Dunner, L.L.P.

(57) ABSTRACT

In the manufacturing of a semi-finished product made of elastomeric material, a method for controlling the heating of an extrusion device which includes multiple structural units having respective different working temperatures and thermal inertias includes: a) setting, for all of the above-mentioned units a heating temperature to a value equal or close to the working temperature of the unit which has the lowest working temperature; b) simultaneously heating all of the above-mentioned units; c) when said unit is approaching or has reached the heating temperature, setting for the other units a new heating temperature to a value equal or close to that of the working temperature of the unit, the working temperature of which is closest to the heating temperature; and d) iteratively repeating the operations mentioned in b) and c), until all of the above-mentioned units have reached the respective working temperature.

17 Claims, 2 Drawing Sheets

(51) Int. Cl.
*B29C 47/78* (2006.01)
*B29C 47/38* (2006.01)
B29C 47/82 (2006.01)
B29D 30/16 (2006.01)
B29C 47/08 (2006.01)
B29C 47/36 (2006.01)
B29C 47/80 (2006.01)
B29C 47/84 (2006.01)
B29C 47/86 (2006.01)
B29K 21/00 (2006.01)
B29K 301/10 (2006.01)

(52) U.S. Cl.
CPC .............. *B29C 47/38* (2013.01); *B29C 47/78* (2013.01); *B29C 47/92* (2013.01); B29C 47/0021 (2013.01); B29C 47/0023 (2013.01); B29C 47/0872 (2013.01); B29C 47/367 (2013.01); B29C 47/80 (2013.01); B29C 47/82 (2013.01); B29C 47/822 (2013.01); B29C 47/84 (2013.01); B29C 47/86 (2013.01); B29C 2947/9298 (2013.01); B29C 2947/92485 (2013.01); B29C 2947/92704 (2013.01); B29C 2947/92876 (2013.01); B29C 2947/92895 (2013.01); B29C 2947/92904 (2013.01); B29D 30/16 (2013.01); B29K 2021/006 (2013.01); B29K 2301/10 (2013.01)

(56) References Cited

U.S. PATENT DOCUMENTS 6,313,212 B1 11/2001 Caretta et al.
2003/0047828 A1* 3/2003 Koyama .................. B29C 45/78
                                                                  264/40.6
2005/0189061 A1 9/2005 Kudo et al.
2008/0236726 A1* 10/2008 D'Oria .................. B29C 47/364
                                                                  156/110.1

FOREIGN PATENT DOCUMENTS

| CN | 201012535 | 1/2008 |
|---|---|---|
| EP | 0 928 680 A1 | 7/1999 |
| JP | 01-267022 | 10/1989 |
| JP | 02-111515 U | 4/1990 |
| JP | 02-309408 | 12/1990 |
| JP | 08-281754 A | 10/1996 |
| JP | 09-076321 | 3/1997 |
| JP | 09-237337 A | 9/1997 |
| JP | 2002-361705 | 12/2002 |
| JP | 2004-199526 | 7/2004 |
| WO | WO 2006/037369 A1 | 4/2006 |
| WO | WO 2009/040594 A1 | 4/2009 |

OTHER PUBLICATIONS

Billmann L. et al; "Temperaturen an Kunststoffver-Arbeitungsmaschinen Adaptiv Regeln", Kunststoffe, Adaptive Temperaturregelung, vol. 81, No. 8, pp. 679-681 (1991).

Notice of Reasons for Rejection mailed Mar. 10, 2015 by the Japan Patent Office in corresponding Application No. JP 2013-517568 (2 pages).

English-language translation of Notice of Reasons for Rejection mailed Mar. 10, 2015 by the Japan Patent Office in corresponding Application No. JP 2013-517568 (2 pages).

Englis-language Notification of the First Office Action dated Sep. 3, 2014 from the Patent Office of the People's Republic of China in corresponding Chinese Patent Application No. 201180030362.X.

* cited by examiner

US 9,403,309 B2

METHOD FOR CONTROLLING THE HEATING OF AN EXTRUSION DEVICE OF A SEMI-FINISHED PRODUCT MADE OF ELASTOMERIC MATERIAL

CROSS REFERENCE TO RELATED APPLICATIONS

This application is a national phase application based on PCT/IB2011/001515, filed Jun. 27, 2011, which claims the priority of Italian Patent Application No. MI2010A001171, filed Jun. 28, 2010, and the benefit of U.S. Provisional Application No. 61/362,889, filed Jul. 9, 2010, the content of all of which is incorporated herein by reference.

BACKGROUND OF THE INVENTION

1. Field of the Invention

The present invention relates to a method for controlling the heating of an extrusion device of a semi-finished product made of elastomeric material.

Preferably, the above-mentioned method is carried out in a process for building a component made of elastomeric material of a tyre for vehicle wheels.

2. Description of the Related Art

Throughout the following description and in the subsequent claims, the expression "elastomeric material" is used to indicate a composition comprising at least one elastomeric polymer and at least one reinforcing filler. Preferably, such composition further comprises additives such as, for example, a cross-linking agent and/or a plasticizer. Thanks to the presence of the cross-linking agent, such material may be cross-linked by heating, so as to make the end product.

The expression "semi-finished product made of elastomeric material", on the other hand, is used to indicate an elongated element made of elastomeric material only and having a flat shape.

The expression "component made of elastomeric material" is used to indicate any component of the tyre, or a part thereof, obtained from said semi-finished product and thus comprising elastomeric material only.

Throughout the present description and in the subsequent claims, "thermal inertia" of a structural unit of an extrusion device indicates the tendency of a structural unit to withstand changes in temperature; it is higher when the mass of material constituting such structural unit is greater.

On the other hand, "working temperature" of a structural unit of the extrusion device indicates the temperature at which such structural unit is maintained during the extrusion process. This implies that at temperatures lower than the operating one, the extrusion process does not take place.

As known, a tyre for vehicle wheels generally comprises a carcass structure comprising at least one carcass ply formed of reinforcing cords incorporated in an elastomeric matrix. The carcass ply has end edges respectively engaged with annular anchoring structures. The latter are arranged in the areas of the tyre usually identified by the name "beads" and they are normally formed each by a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre coming out from such a seat.

At the beads specific reinforcement structures may be provided having the function of improving the torque transmission to the tyre.

In tyres devoid of inner tube, called "tubeless", an airtight coating layer made of elastomeric material, typically called liner, is typically provided in a radially inner position with respect to the carcass ply/plies.

In a radially outer position with respect to the carcass structure, on the other hand, a belt structure is associated.

The belt structure comprises one or more belt layers arranged radially one on top on the other and having textile or metallic reinforcement cords arranged preferably according to an inclined orientation with respect to the circumferential direction of the tyre and normally crossed with respect to the cords of the possible adjacent belt layer.

The belt structure can further comprise at least one reinforcing structure defined by at least one continuous reinforcing elongated element including at least one textile or metallic reinforcement cord incorporated in a matrix of elastomeric material and extending parallel to the longitudinal direction of the elongated element itself.

Between the carcass structure and the belt structure a layer of elastomeric material, called "under-belt", can be provided, said layer having the function of making the radially outer surface of the carcass structure as uniform as possible for the subsequent application of the belt structure.

In a radially outer position with respect to the belt structure a tread band is applied, also made of elastomeric material, as well as other structural elements making up the tyre.

Respective sidewalls of elastomeric material are also applied on the side surfaces of the carcass structure, each extending from one of the side edges of the tread band up to the respective annular anchoring structure to the beads.

From the above description it is clear that a tyre for vehicle wheels typically comprises a plurality of components made of elastomeric material only, according to the definition given above. Among them the following components can be identified, as non-limiting examples: tread band, sidewalls, the so-called under-belt and/or under-layer layers, filling inserts of the annular anchoring structures, liner, sub-liner, sidewall inserts, reinforcing inserts, etc.

The above-mentioned components may be made starting from semi-finished products made of elastomeric material only, obtained by an extrusion process. The extruded semi-finished product is then laid on a forming support which can rotate about a rotation axis, so as to obtain a deposition preferably according to adjacent and/or at least partly superimposed coils, depending on the component to be made.

Typically, the extrusion process is carried out in a device consisting of a plurality of structural units having different mass, thermal inertia and working temperature, where at least some structural units having low mass and thermal inertia have a high working temperature and vice versa.

Prior to feeding the elastomeric material into the extrusion device, all of the above structural units are brought to the respective working temperature.

WO 2006/037369, in the name of the Applicant, recites that in a process for manufacturing an elastomeric tyre component, the elastomeric component is fed to an extruding device comprising a plurality of units each having a respective working temperature. Said units are heated to reach the respective working temperature, starting from the unit having the lowest working temperature up to the unit having the highest working temperature.

SUMMARY OF THE INVENTION

The Applicant has considered that, in order to ensure that during the extrusion process the elastomeric material fed into the extrusion device has sufficient fluidity at the required operating flow rates and pressures, all of the above units must be heated to reaching the respective working temperature prior to the feeding of the elastomeric material into the extrusion device.

The Applicant has further considered that in order to minimise the process times, said heating should occur as a whole in the shortest possible time.

On the other hand, the Applicant has considered that whenever the extrusion process is ended or interrupted, it is advantageous to leave some elastomeric material into the extrusion device to prevent the formation of air bubbles, which would cause troubles upon restart.

The Applicant has then observed that irrespective of the fact that the extruder is emptied or not, it is not possible to quickly empty the end portion of the machine when it comprises a gear pump and a nozzle (such units normally being those with higher working temperature and smaller mass). In fact, emptying in this case is only possible upon mechanical disassembly, which requires some time.

Due to the presence of such elastomeric material, it is necessary preventing that reaching the respective working temperature by one of said units causes an excessive and/or prolonged heating of another unit having lower mass and thermal inertia and higher working temperature. In this case there would be an undesired vulcanization of the elastomeric material at the last mentioned unit, with consequent need of disassembling the extrusion device for eliminating any traces of vulcanized material prior to the next use thereof. This is quite burdensome in terms of time and practicality.

The Applicant has noted that the process described in said WO 2006/037369 actually allows meeting the at least partly opposed requirements discussed above.

However, the Applicant has observed that in order to allow said process to actually give the desired advantageous effects in the practical embodiment thereof, it is necessary to know the actual mass and thermal inertia of each of the units of the specific extrusion device used. This allows the actual heating profile of each unit to be known so as to determine the exact moment to activate the heating of each unit. In the practice, it would therefore be necessary to run experimental tests on the single units of the specific extrusion device used. According to the Applicant, such procedure is quite burdensome in terms of process times and costs.

The Applicant has noted that a method suitable for allowing the respective working temperature to be reached by all the units making up the extrusion device as quickly as possible, without risking a vulcanization of the elastomeric material at any one of the above units and without the need of running experimental tests beforehand on the single units of the specific extrusion device used would meet even better the opposed process requirements.

The Applicant has observed that through a particular heating procedure of said units that may be automatically implemented on any extrusion device, irrespective of the size and/or type thereof, the above results would be achieved without the need of running experimental tests on the single units of the specific extrusion device used.

Firstly, the Applicant has understood that in order to limit the heating process cycle time as much as possible it is suitable to implement an automatic procedure that initially provides for the simultaneous heating of all the units, thus carrying out a method totally different from that described in WO 2006/037369, which instead provides for a predetermined sequence of activation of the heating starting from the unit having the lowest working temperature up to that having the highest working temperature.

The Applicant has further understood that in order to prevent the risk of having a vulcanization of the elastomeric material into the extrusion device, it is advisable that the above heating procedure be such as to allow the units having a low thermal inertia and a high working temperature to be the last ones reaching the respective working temperatures, that is, once the units having higher thermal mass and lower working temperature have reached their working temperatures.

The Applicant has perceived that such result may be effectively obtained by implementing a heating procedure that at first provides for a simultaneous heating of all the units up to a predetermined temperature value and when a predetermined unit is close to or has reached such temperature, a further simultaneous heating of the other units up to a new temperature value properly predetermined. Such further simultaneous heating is repeated several times and each time only for the units that have not yet reached the respective working temperature, such repetition continuing until all the units of the extrusion device have reached the respective working temperature.

In particular, the Applicant has found that by carrying out a heating procedure that provides for:
- an initial simultaneous heating of all the units until the unit having the lowest working temperature has reached the working temperature,
- when said unit is close to or has reached said working temperature, a subsequent simultaneous heating of the other units until the working temperature of the unit of said other units whose working temperature is closest to the heating temperature previously set has been reached,
- a repetition of such subsequent heating each time with reference to only the units having working temperature higher than the last set heating temperature and until all the units of the extrusion device have reached the respective working temperature;

it is advantageously possible to bring as quickly as possible all the units making up the extrusion device to the respective working temperature without any risk of vulcanization of the elastomeric material at any one of the above units and without the need of running experimental tests beforehand on the single units of the specific extrusion device used in order to determine mass and thermal inertia of each of such units.

In a first aspect thereof, the present invention therefore relates to a method for controlling the heating of an extrusion device of a semi-finished product made from elastomeric material, the extrusion device comprising a plurality of structural units, each structural unit having a working temperature different to the working temperature of at least one other structural unit and a thermal inertia different to the thermal inertia of at least one other structural unit, the method comprising:

a) setting, for each structural unit, a heating temperature to a value equal or close to that of the working temperature of the structural unit which has the lowest working temperature;
b) simultaneously heating all the structural units of said extrusion device;
c) when the structural unit having the lowest working temperature is approaching or has reached said heating temperature, setting, for the other structural units, a subsequent heating temperature to a value equal or close to that of the working temperature of the structural unit of said other structural units whose working temperature is closest to the heating temperature previously set;
d) iteratively repeating the operations recited in b) and c), for only those structural units having a working temperature greater than the heating temperature lastly set, until all of the structural units of the extrusion device have reached the respective working temperature.

The Applicant believes that with the method of the present invention, when a structural unit reaches its working temperature, also the other structural units that have a lower working temperature have substantially already reached such temperature. Advantageously, this reduces the time interval required for each structural unit to reach the respective working temperature, with an advantageous reduction of the overall implementation time of the extrusion process. Moreover, the risk of having a vulcanization of the elastomeric material at a structural unit having low thermal inertia and high working temperature is prevented. In fact, such working temperature is reached lastly and although the heating of said structural unit is relatively fast due to the low thermal inertia, the residence time at the high working temperature before starting the feeding of the elastomeric material is reduced to the minimum.

The method of the present invention can advantageously be implemented on any extrusion device, preferably those with a gear pump, where mixture is always present at the end portion of the machine which may be removed only by disassembling parts of the machinery (the extruders with opening head and without gear pump usually allow the machine to be fully emptied, thus the cross-linking problem does not occur), irrespective of the number and type of structural units that make up such extrusion device and irrespective of the difference of mass and/or thermal inertia of said structural units. In fact, in order to implement said method it is sufficient to know only the working temperature of each structural unit making up the extrusion device.

The present invention may have at least one of the following preferred features, taken individually or in combination with the others.

Preferably, said iterative repetition comprises at least:
e) simultaneously heating said other structural units of said extrusion device.

More preferably, said iterative repetition also comprises at least:
f) when the structural unit of said other structural units which has the lowest working temperature is approaching or has reached said subsequent heating temperature, setting, for the remaining structural units, a further heating temperature to a value equal or close to that of the working temperature of the structural unit of said remaining structural units whose working temperature is closest to the heating temperature lastly set.

Even more preferably, said iterative repetition also comprises at least:
g) iteratively repeating the operations recited in e) and f), for only those structural units having a working temperature greater than the heating temperature lastly set, until all of the structural units of the extrusion device have reached the respective working temperature.

The above method may be implemented without distinction on extrusion devices having a number of structural units higher than or equal to, two. Just in order to illustrate the present invention in a sufficiently clear and understandable manner, in the previous paragraphs and throughout the following description (as well as in the subsequent claims), reference has been and shall be made to an extrusion device having three or more structural units.

In the preferred embodiments of the present invention, each structural unit has a working temperature different to the working temperature of all the other structural units.

Preferably, each structural unit has a thermal inertia different to the thermal inertia of all the other structural units.

In preferred embodiments of the present invention, said plurality of structural units comprises at least one housing, at least one member for moving the elastomeric material inside said at least one housing and at least one drawing member of the elastomeric material.

Preferably, said at least one member for moving the elastomeric material comprises an extrusion screw. Such particular moving member has a relatively low working temperature and a predetermined thermal inertia.

Preferably, said at least one housing has a working temperature higher than that of the member for moving the elastomeric material.

Preferably, said at least one housing has a thermal inertia higher than that of the member for moving the elastomeric material.

In the preferred embodiments of the present invention, said at least one drawing member comprises at least one nozzle. Such particular drawing member is characterised in that it has a particularly low thermal inertia and a particularly high working temperature. Therefore, it is a highly critical element as regards the risk of vulcanization discussed above. In this case, the method of the present invention is particularly advantageous since it provides that reaching the working temperature of the nozzle occurs once all the other structural units of the extrusion device have reached their working temperature, thus reducing to the minimum the residence time of the nozzle at such high working temperature before the extrusion process for manufacturing the semi-finished product made of elastomeric material takes place.

In alternative embodiments, said at least one drawing member comprises at least one pair of calender rollers.

In the preferred embodiments of the present invention, said plurality of structural units further comprises at least one gear pump assembly arranged between said at least one member for moving the elastomeric material and said at least one drawing member of the elastomeric material. Such pump assembly preferably has a thermal inertia lower than that of the member for moving the elastomeric material and higher than that of the drawing member of the elastomeric material, especially when a nozzle is used as drawing member.

Preferably, said at least one housing has a working temperature not lower than about 50° C., more preferably not lower than about 60° C.

Preferably, said at least one housing has a working temperature not higher than about 120° C., more preferably not lower than about 90° C.

In particularly preferred embodiments of the present invention, said at least one housing has a working temperature comprised between about 50° C. and about 120° C., more preferably between about 50° C. and about 90° C., even more preferably between about 60° C. and 90° C., even more preferably equal to about 80° C.

Preferably, said at least one member for moving the elastomeric material has a working temperature not lower than about 40° C., more preferably not lower than about 50° C.

Preferably, said at least one member for moving the elastomeric material has a working temperature not higher than about 120° C., more preferably not higher than about 90° C.

In particularly preferred embodiments of the present invention, said at least one member for moving the elastomeric material has a working temperature comprised between about 40° C. and about 120° C., more preferably between about 50° C. and about 90° C., even more preferably equal to about 80° C.

Preferably, said at least one drawing member has a working temperature not lower than about 70° C., more preferably not lower than about 90° C.

Preferably, said at least one drawing member has a working temperature not higher than about 130° C., more preferably not higher than about 125° C.

In particularly preferred embodiments of the present invention, said at least one drawing member has a working temperature comprised between about 70° C. and about 130° C., more preferably between about 90° C. and about 125° C., even more preferably equal to about 110° C.

Preferably, said at least one gear pump assembly has a working temperature not lower than about 70° C., more preferably not lower than about 80° C.

Preferably, said at least one gear pump assembly has a working temperature not higher than about 120° C., more preferably not higher than about 110° C.

In particularly preferred embodiments of the present invention, said at least one pump assembly has a working temperature comprised between about 70° C. and about 120° C., more preferably between about 80° C. and about 110° C., even more preferably equal to about 110° C.

In preferred embodiments of the present invention, the working temperatures of said structural units are such as to define a set of increasing temperatures in the following order: member for moving the elastomeric material, housing, drawing member of the elastomeric material.

Preferably, the working temperatures of said structural units are such as to define a set of increasing temperatures in the following order: member for moving the elastomeric material, housing, gear pump assembly and drawing member of the elastomeric material.

In preferred embodiments of the present invention, the thermal inertias of said structural units are such as to define a set of decreasing thermal inertias in the following order: housing, member for moving the elastomeric material, drawing member of the elastomeric material.

Preferably, the thermal inertias of said structural units are such as to define a set of decreasing thermal inertias in the following order: housing, member for moving the elastomeric material, gear pump assembly and drawing member of the elastomeric material.

In preferred embodiments of the present invention, said semi-finished product made of elastomeric material has, in the output section of said drawing member, a thickness not smaller than about 0.5 mm, preferably not smaller than about 0.6 mm.

In preferred embodiments of the present invention, said semi-finished product made of elastomeric material has, in the output section of said drawing member, a thickness not greater than about 4 mm, preferably not greater than about 2 mm.

In particularly preferred embodiments of the present invention, said semi-finished product made of elastomeric material has, in the output section of said drawing member, a thickness comprised between about 0.5 mm and about 4 mm, more preferably between about 0.6 mm and about 2 mm.

In a preferred embodiment of the present invention, said semi-finished product made of elastomeric material has, in the output section of said drawing member, a width comprised between about 5 mm and about 25 mm.

In preferred embodiments of the present invention, the elastomeric material is fed into the extrusion device with a flow rate comprised between about 2 $cm^3/s$ and about 50 $cm^3/s$. Advantageously, such flow rate values allow limiting the overall cycle time.

All the value ranges recited in the present description and in the subsequent claims should be understood as specifically including also any sub-range between any minimum and maximum value belonging to the respective range, even if the minimum and maximum values of such sub-ranges are not explicitly recited in this description.

Preferably, the heating of the extrusion device is automatically controlled through a remote control unit that also manages the subsequent extrusion of the elastomeric material (when all the structural units of the extrusion device have reached the respective working temperature) for manufacturing the semi-finished product made of elastomeric material.

BRIEF DESCRIPTION OF THE DRAWINGS

Further features and advantages of the present invention will appear more clearly from the following detailed description of some embodiments thereof, made with reference to the attached drawings. In such drawings.

DETAILED DESCRIPTION OF THE INVENTION

The present invention has a preferred embodiment thereof in a process for building a component made of elastomeric material of a tyre for vehicle wheels.

The above-mentioned process is preferably carried out by providing the movement of a first forming support along a first building line for building a carcass structure comprising at least one carcass ply and a pair of annular anchoring structures, and the movement of a second forming support along a second building line for building a crown structure comprising at least one belt structure and a tread band. The carcass structure and the crown structure thus built are transferred, with a synchronised movement in production-frequency and by respective robot arms, to a workstation for assembling and shaping the tyre being processed, where the carcass structure and the crown structure are reciprocally associated so as to obtain a green tyre. Such green tyre is then transferred on a moulding and curing line for obtaining the finished product.

As an alternative, the process for building a component made from elastomeric material of a tyre for vehicle wheels, wherein the present invention is embodied, may be carried out in a process for building a tyre wherein the single tyre components are directly built, according to a predetermined frequency, on a single forming support, generally toroidal.

In the above-described processes, the components made of elastomeric material only (such as for example tread band, sidewalls, the so-called under-belt and/or under-layer layers, filling inserts of the annular anchoring structures, liner, sub-liner, sidewall inserts, reinforcing inserts, etc) are obtained starting from a semi-finished product made of elastomeric material only. Such semi-finished product is obtained by extrusion and is laid on a forming support while the latter is moved around a rotation axis thereof, so as to obtain a deposition preferably according to adjacent and/or at least partly superimposed coils, according to the component to be made.

Figure 1:
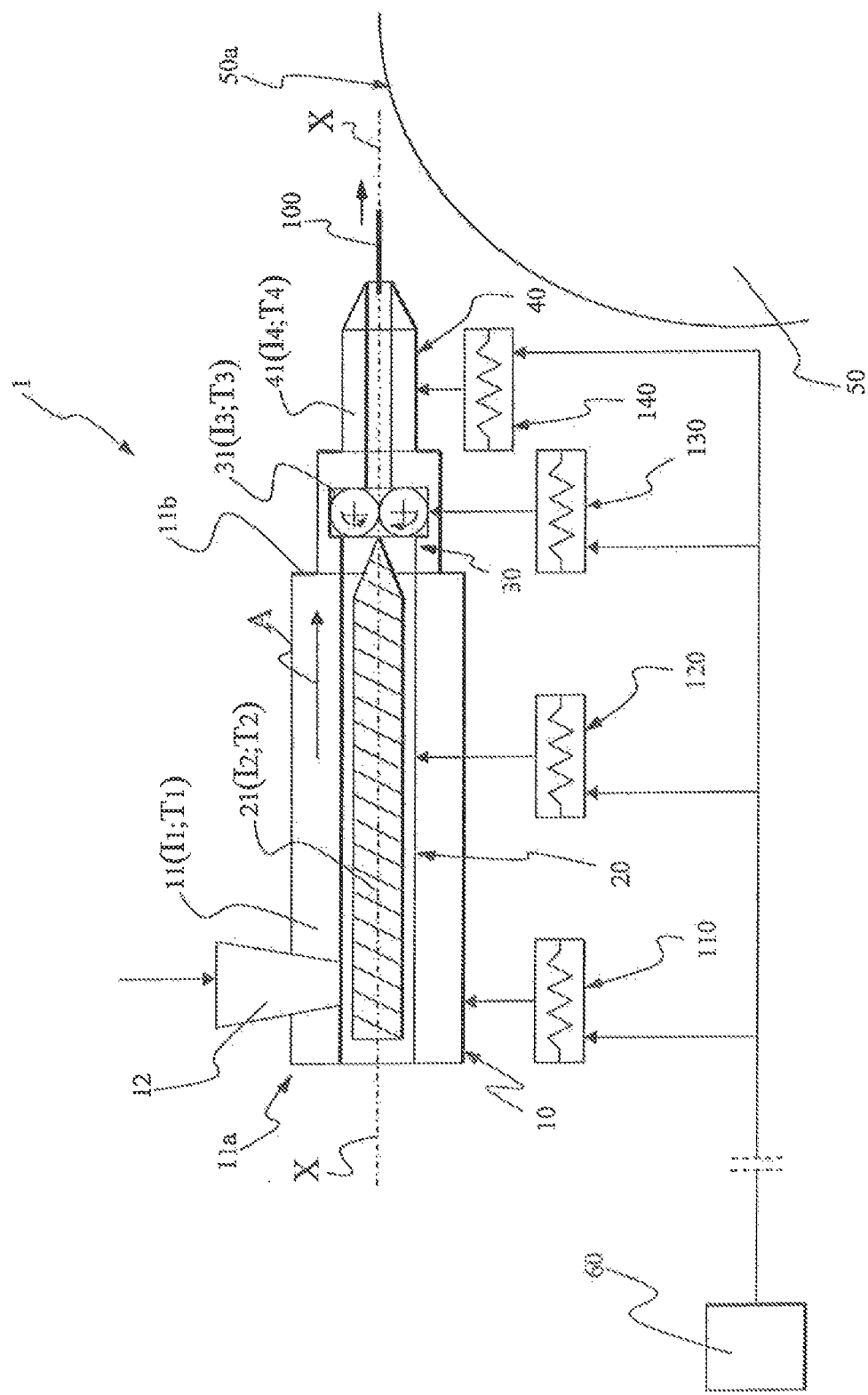
FIG. 1 is a schematic view of an extrusion device that may be used in the method of the present invention.

The extrusion of the semi-finished product takes place at an extrusion device 1 of the type illustrated in FIG. 1. The semi-finished product obtained through such extrusion device is indicated with 100, whereas the forming support whereon such semi-finished product 100 is laid is indicated with 50.

The extrusion device 1 preferably comprises four different structural units, each preferably having mass, thermal inertia ($I_i$) and working temperature ($T_i$) different from those of the other structural units.

A first structural unit 10 of the extrusion device 10 is defined by a housing 11 in turn defined by a hollow body having a longitudinal axis X-X. The housing 11 comprises, at an upstream end portion 11a thereof, a hopper 12 for loading the elastomeric material to be extruded.

A second structural unit 20 of the extrusion device 10 is defined by an extrusion screw 21 rotatably mounted within the housing 11. The extrusion screw 21 acts as a member for moving the elastomeric material within the housing 11. In particular, the extrusion screw 21 moves the elastomeric material from the upstream end portion 11a of housing 11 to a downstream end portion 11b of housing 11, along a movement direction generally indicated with A.

A third structural unit 30 of the extrusion device 10 is preferably defined by a gear pump assembly 31 operatively associated with the housing 11 at the downstream end portion 11b thereof. Such gear pump assembly 31 receives the elastomeric material carried by the extrusion screw 21 and pushes it by pressure downstream, with reference to the moving direction A of the elastomeric material.

A fourth structural unit 40 of the extrusion device 10 is preferably defined by a nozzle 41 associated with the gear pump assembly 31 downstream thereof, always with reference to the moving direction A of the elastomeric material. Through such nozzle 41, the elastomeric material pushed by the gear pump assembly 31 is drawn as a semi-finished product 100, to be then laid on the outer surface 50a of the forming support 50.

Preferably, the gear pump assembly 31 pushes the elastomeric material into the nozzle 41 with a pressure not lower than about 30 bar, preferably comprised between about 40 bar and about 600 bar.

The elastomeric material is fed towards the forming support with a flow rate preferably not lower than about 2 cm³/s, more preferably comprised between about 3 cm³/s and about 50 cm³/s.

In an alternative embodiment (not shown) of the extrusion device 1 of the present invention, instead of the nozzle 41 it is possible to use a pair of calender rollers as a member for drawing the elastomeric material.

Nozzle 41 has an output opening for the elastomeric material shaped so as to define a semi-finished product 100 made of elastomeric material having desired shape and dimensions.

In preferred embodiments of the present invention, the semi-finished product 100 made of elastomeric material is defined by a flat element having, in the output section of said drawing member, a thickness not smaller than about 0.5 mm, preferably not smaller than about 0.6 m, more preferably comprised between about 0.5 mm and about 3 mm, even more preferably comprised between about 0.6 mm and about 2 mm.

Said flat element further has, in the output section of said drawing member, a width preferably comprised between about 5 mm and about 25 mm.

The working temperatures of said structural units 11, 21, 31, 41 preferably define a set of working temperatures $T_i$ that increase in the following order: extrusion screw 21 (working temperature $T_1$), housing 11 (working temperature $T_2$), gear pump assembly 31 (working temperature $T_3$) and nozzle 41 (working temperature $T_4$).

The thermal inertias of said structural units 11, 21, 31, 41 on the other hand define a set of thermal inertias $I_i$ that decrease in the following order: housing 11 (thermal inertia $I_1$), extrusion screw 21 (thermal inertia $I_2$), gear pump assembly 31 (thermal inertia $I_3$) and nozzle 41 (thermal inertia $I_4$).

Preferably, the housing 11 has a working temperature ($T_2$) comprised between about 50° C. and about 120° C., more preferably between about 50° C. and about 90° C., even more preferably between about 60° C. and about 90° C., even more preferably equal to about 80° C.

Preferably, the extrusion screw 21 has a working temperature ($T_1$) comprised between about 40° C. and about 120° C., more preferably between about 50° C. and about 90° C., even more preferably equal to about 80° C.

Preferably, the nozzle 41 has a working temperature ($T_4$) comprised between about 70° C. and about 130° C., more preferably between about 90° C. and about 125° C., even more preferably equal to about 110° C.

Preferably, the gear pump assembly 31 has a working temperature ($T_3$) comprised between about 70° C. and about 120° C., more preferably between about 80° C. and about 110° C., even more preferably equal to about 100° C.

Each of said structural units 11, 21, 31, 41 is operatively associated with a respective control unit provided for heating the structural unit up to reaching the respective working temperature.

In particular, the housing 11 is operatively associated with a first control unit 110, the extrusion screw 21 is operatively associated with a second control unit 120, the gear pump assembly 31 is operatively associated with a third control unit 130 and the nozzle 41 is operatively associated with a fourth control unit 140.

Control units 110-140 are all operatively associated with a remote control unit 60 which, besides automatically controlling the heating of said structural units 11, 21, 31, 41, also manages the subsequent extrusion of the elastomeric material once all the structural units 11, 21, 31, 41 have reached the respective working temperature.

The control of the heating of the various structural units 11, 21, 31, 41 of the extrusion device 1 of the semi-finished product 100 made of elastomeric material takes place according to the method described below, with reference to FIG. 2. Such figure shows a diagram having time values expressed in minutes on the abscissa and temperature values expressed in degrees Celsius on the ordinate.

At first, all the control units 110-140 are set to a first heating temperature $T_{h1}$ having a value equal or close to that of the lowest temperature in the set of temperatures $T_i$ described above, substantially corresponding to the working temperature $T_1$ of the extrusion screw 21 (for example, about 60° C.).

Control units 110-140 are then simultaneously switched on in order to heat all the structural units 11, 21, 31, 41 up to reaching temperature $T_{h1}$. Since each of said structural units 11, 21, 31, 41 has a mass and a thermal inertia Ii different from that of the other structural units, the heating of the various structural units 11, 21, 31, 41 will take place in different times and according to different heating profiles.

In the specific case of the extrusion device 1 illustrated in FIG. 1, since the nozzle 41 has a thermal inertia $I_4$ lower than that of the other structural units, it will be the first to reach temperature $T_{h1}$ (curve a in FIG. 2), followed in the order by the gear pump assembly 31 (which has a thermal inertia $I_3$ immediately higher than that of the nozzle 41—curve b), the extrusion screw 21 (which has a thermal inertia $I_2$ immediately higher than that of the pump assembly 31—curve c), and the housing 11 (which has a thermal inertia $I_1$ immediately higher than that of the extrusion screw 21—curve d).

Close to or upon reaching temperature $T_{h1}$ by the extrusion screw 21 (curve c, time tc), control units 110, 130 and 140 are automatically set to a second temperature value $T_{h2}$ equal or close to that of the second lower working temperature in the set of temperatures Ti described above, substantially corresponding to the working temperature $T_2$ of the housing 11 (for example, about 80° C.).

The simultaneous heating of the gear pump assembly 31 and of the nozzle 41 (which at time tc have already reached the heating temperature $T_{h1}$) is then resumed up to reaching temperature $T_{h2}$. Simultaneously with said heating, the heating of the housing 11 (which at time tc has not yet reached the heating temperature $T_{h1}$) continues up to reaching temperature $T_{h2}$.

Close to or upon reaching temperature $T_{h2}$ by the housing 11 (curve d, time td), control units 130 and 140 are automatically set to a third temperature value $T_{h3}$ equal or close to that of the third lower working temperature in the set of temperatures Ti described above, substantially corresponding to the working temperature $T_3$ of the gear pump assembly 31 (for example, about 100° C.).

The simultaneous heating of the gear pump assembly 31 and of the nozzle 41 (which at time td have already reached the heating temperature $T_{h2}$) is then resumed up to reaching temperature $T_{h3}$.

Close to or upon reaching temperature $T_{h3}$ by the gear pump assembly (curve b, time tb), the control unit 140 is automatically set to a fourth temperature value $T_{h4}$ substantially equal or close to the working temperature $T_4$ of nozzle 41 (for example about 110° C.).

The heating of nozzle 41 (which at time tb has already reached the heating temperature $T_{h3}$) is then resumed up to reaching the working temperature $T_4$ thereof (curve a, time ta).

At this point, since all the structural units 11, 21, 31, 41 of the extrusion device 1 have reached the respective working temperature $T_1$-$T_4$, the feeding of the elastomeric material into the hopper 12 of the extrusion device 1 can take place so as to obtain the semi-finished product 100 made of elastomeric material. Such semi-finished product 100 is in turn suitable for being used, in the preferred embodiments of the present invention, for building a component made of elastomeric material of a tyre for vehicle wheels by deposition on the outer surface 50a of said forming support 50.

Control units 110, 120, 130 and 140 are suitable for resuming the heating of one or more structural units whose working temperature has already been reached, if one of the working temperatures already reached would drop below a predetermined threshold value before the last working temperature is reached by the corresponding structural unit.

Figure 2:
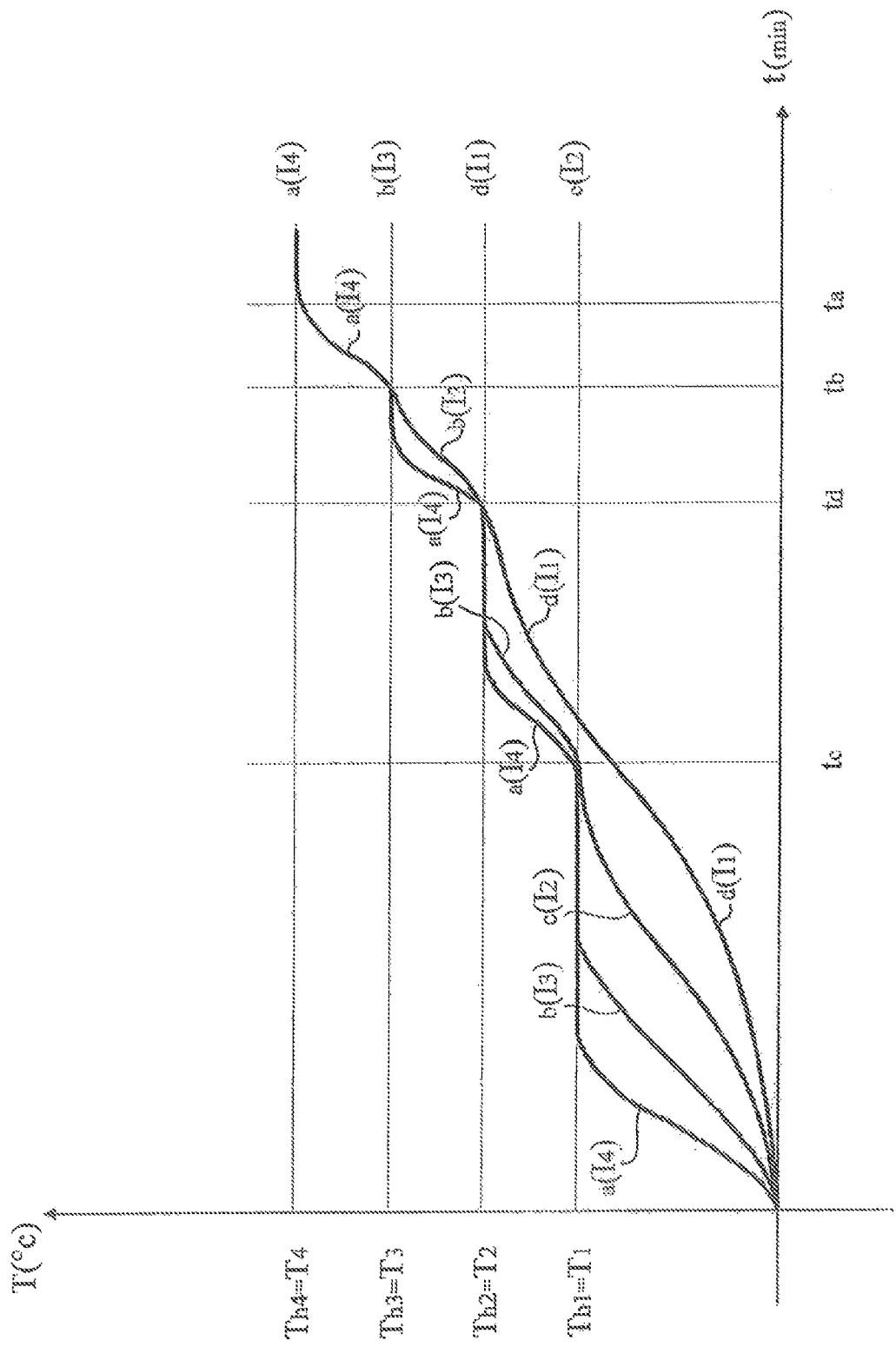
FIG. 2 shows a diagram that illustrates a heating method of the extrusion device of FIG. 1 according to the present invention.

In the diagram of FIG. 2, the heating temperatures $T_{h1}$-$T_{h4}$ are indicated as equal to the working temperatures $T_1$-$T_4$ for simplicity of description only, said temperatures may anyway actually be not exactly matching.

From the above description it is clear that the risk of having a vulcanization of the elastomeric material inside the nozzle 41 (which is the structural unit having the lowest thermal inertia and the highest working temperature) is substantially eliminated due to the fact that such nozzle 41 reaches the working temperature $T_4$ lastly, that is, after the other structural units 11, 21, 31 (having higher thermal mass and lower working temperature) have reached their working temperatures. While the heating of the nozzle 41 is relatively quick due to the low thermal inertia thereof, the residence time of nozzle 41 at the respective high working temperature T4 before starting the extrusion process is minimised in this way.

It is also clear that the time required for bringing all the structural units 11, 21, 31, 41 to the respective working temperature is also highly reduced; this is both due to the fact that at first there is the simultaneous heating of all the structural units 11, 21, 31, 41, and also because when a structural unit reaches its working temperature $T_1$-$T_4$, also the other structural units that have a lower working temperature have already reached such temperature, thus reducing the time interval required for each structural unit to reach the respective working temperature.

The above method may be carried out on extrusion devices consisting of just two structural units too, or on extrusion devices consisting of more than four structural units. In this last-mentioned case, the setting and heating operations described above are iteratively repeated multiple times and each time only for the structural units having working temperature Ti higher than the heating temperature $T_{hi}$ set lastly, until all the structural units of the extrusion device have reached the respective working temperature.

It is clear that a man skilled in the art may make further changes and variants to the invention described hereinbefore in order to meet specific and contingent application requirements, changes and variants which in any case fall within the scope of protection defined by the following claims.

The invention claimed is:

1. A method for controlling the heating of an extrusion device of a semi-finished product made of elastomeric material, the extrusion device comprising a plurality of structural units, each structural unit having a working temperature different from the working temperature of at least one other structural unit and a thermal inertia different from the thermal inertia of at least one other structural unit, comprising:
   a) setting, for each structural unit, a heating temperature to a value equal or close to the working temperature of the structural unit which has a lowest working temperature;
   b) simultaneously heating all structural units of said extrusion device;
   c) when the structural unit having the lowest working temperature is approaching or has reached said heating temperature, setting, for other structural units, a subsequent heating temperature to a value equal or close to the working temperature of the structural unit, among said other structural units, closest to the heating temperature previously set;
   d) simultaneously heating said other structural units of said extrusion device; and
   e) iteratively repeating the operations recited in c) and d), for only structural units having a working temperature greater than the heating temperature last set, until all of the structural units of the extrusion device have reached a respective working temperature.

2. The method according to claim 1, wherein each structural unit has a working temperature different from the working temperature of all other structural units.

3. The method according to claim 1, wherein each structural unit has a thermal inertia different from the thermal inertia of all other structural units.

4. The method according to claim 1, wherein said plurality of structural units comprises at least one housing, at least one member for moving the elastomeric material inside said at least one housing and at least one drawing member of the elastomeric material.

5. The method according to claim 4, wherein said at least one drawing member comprises at least one nozzle.

6. The method according to claim 4, wherein said plurality of structural units further comprises at least one gear pump assembly arranged between said at least one member for moving the elastomeric material and said at least one drawing member of the elastomeric material.

7. The method according to claim 4, wherein said at least one housing has a working temperature of between about 50° C. and about 120° C.

8. The method according to claim 4, wherein said at least one member for moving the elastomeric material has a working temperature of between about 40° C. and about 120° C.

9. The method according to claim 4, wherein said at least one drawing member has a working temperature of between about 70° C. and about 130° C.

10. The method according to claim 6, wherein said at least one gear pump assembly has a working temperature of between about 70° C. and about 120° C.

11. The method according to claim 4, wherein the working temperatures of said structural units are such as to define a set of temperatures increasing in the following order: member for moving the elastomeric material, housing, and drawing member of the elastomeric material.

12. The method according to claim 6, wherein the working temperatures of said structural units are such as to define a set of temperatures increasing in the following order: member for moving the elastomeric material, housing, gear pump assembly and drawing member of the elastomeric material.

13. The method according to claim 4, wherein the thermal inertias of said structural units are such as to define a set of thermal inertias decreasing in the following order: housing, member for moving the elastomeric material, and drawing member of the elastomeric material.

14. The method according to claim 6, wherein the thermal inertias of said structural units are such as to define a set of thermal inertias decreasing in the following order: housing, member for moving the elastomeric material, gear pump assembly and drawing member of the elastomeric material.

15. The method according to claim 4, wherein said semi-finished product made of elastomeric material has, in an output section of said drawing member, a thickness of between about 0.5 mm and about 4 mm.

16. The method according to claim 4, wherein said semi-finished product made of elastomeric material has, in an output section of said drawing member, a width of between about 5 mm and about 25 mm.

17. The method according to claim 1, wherein the elastomeric material is fed into the extrusion device with a flow rate of between about 2 $cm^3/s$ and about 50 $cm^3/s$.

* * * * *